United States Patent [19]

Claas et al.

[11] 4,440,416
[45] Apr. 3, 1984

[54] AGRICULTURAL MACHINE

[75] Inventors: Helmut Claas; Nils Frederiksen, both of Harsewinkel, Fed. Rep. of Germany

[73] Assignee: Claas Ohg, Harsewinkel, Fed. Rep. of Germany

[21] Appl. No.: 357,558

[22] Filed: Mar. 12, 1982

[30] Foreign Application Priority Data

Mar. 12, 1981 [DE] Fed. Rep. of Germany ....... 3109409

[51] Int. Cl.³ .............................................. B60D 1/14
[52] U.S. Cl. ...................................... 280/473; 56/228; 180/53.61; 180/53.62
[58] Field of Search ................... 180/53.1, 53.62, 53.6, 180/53.61, 14 E; 280/411 A, 411 B, 415 R, 473, 472; 56/228, 11.8, 15.6

[56] References Cited

U.S. PATENT DOCUMENTS 2,143,473  1/1939  Brown ................................. 180/53.1
2,202,345  5/1940  Johnson ............................. 180/53.62
2,658,770  11/1953 Koenig ............................ 280/415 R
2,793,053  5/1957  Wathen et al. ...................... 280/472

Primary Examiner—Joseph F. Peters, Jr.
Assistant Examiner—Donn McGiehan
Attorney, Agent, or Firm—Michael J. Striker

[57] ABSTRACT

A motorless harvester thresher is coupled with a multi-purpose vehicle by means of a coupling rod and a coupling linkage extended between the vehicle and the thresher and pivotally mounted to a lateral side of the vehicle and to a lateral side of the thresher.

A driven front axle of the vehicle supporting the front wheels thereof coupled with a non-steerable front axle of the front wheels of the harvester thresher by means of the coupling rod connected to a clutch which can be engaged to or disengaged from the coupling rod so as to ensure the axial alignment of front axes of the vehicle and the machine so as to provide for a stable lateral position of the thresher relative to the vehicle in the traveling movement thereof.

17 Claims, 1 Drawing Figure

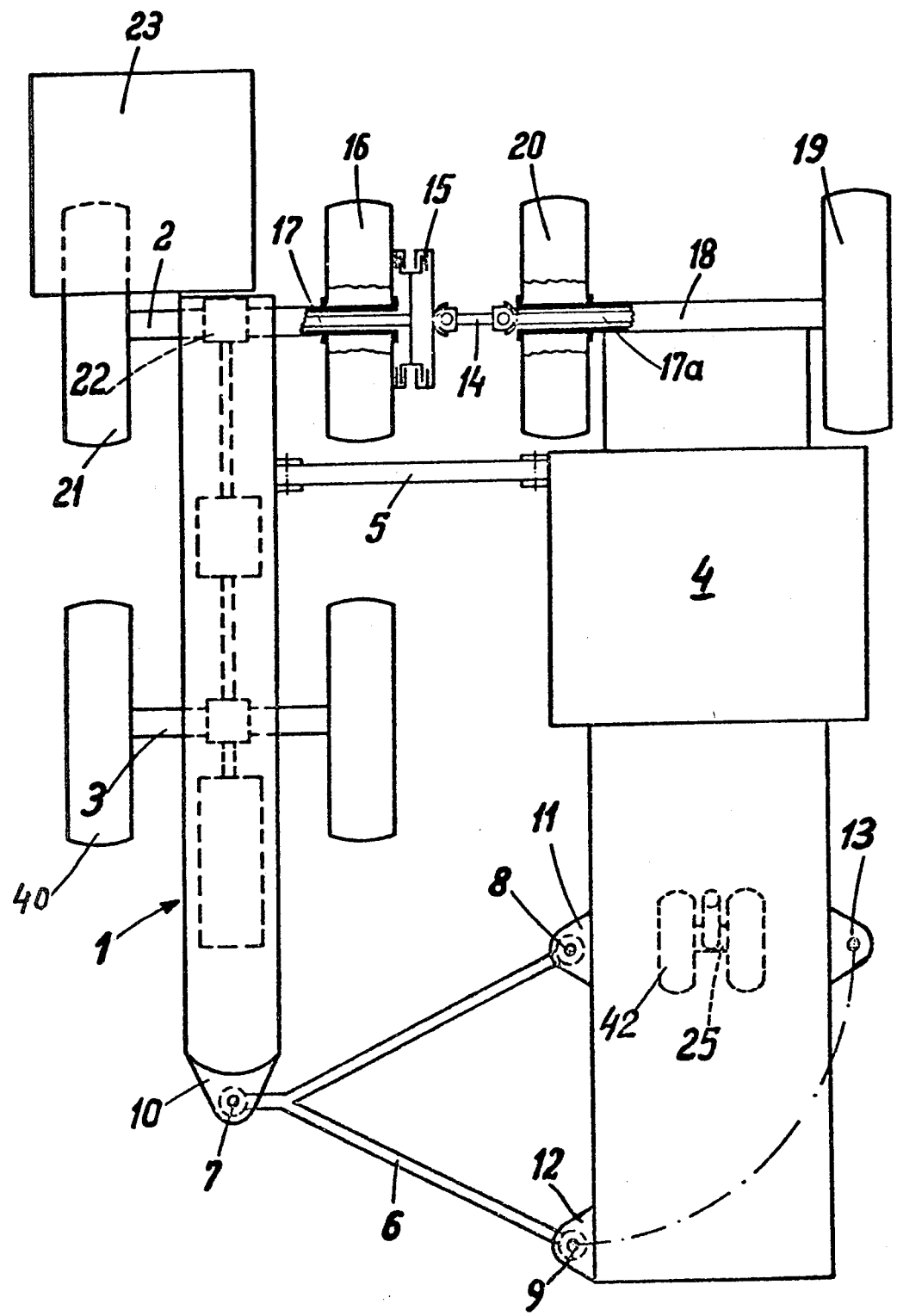

AGRICULTURAL MACHINE

BACKGROUND OF THE INVENTION

The present invention relates to a motorless agricultural machine, for example harvester thresher, combined with a multi-purpose vehicle.

In known multi-purpose vehicles a front axle with front wheels is usually driven and a rear axle with rear wheels is freely arranged.

The problem in known combined agricultural machines is that during operation an operator should be able to observe the agricultural machine not only in a direction of traveling of the vehicle but also behind the vehicle to check the position of the machine relative to vehicle. Since the agricultural machine should in its traveling exactly follow the traveling of the vehicle a driver must constantly observe the field in two opposite directions to watch the agricultural machine, which is very inconvenient. This is particularly disadvantageous when the tractor is so positioned relative to the machine with which it is coupled that the tractor is sidewise displaced in rearward direction; a seat for a driver in such machines is also displaced in rearward direction relative to the agricultural machine.

A further disadvantage of the known arrangements is that in operation the travel-resistance force exerted on the agricultural machine is offset to the advance force exerted on the vehicle whereby a gyro moment (a moment about a vertical axis) may be generated which can be compensated in traveling of the machine by means of corresponding links. In case deep bottom plates and hanger and lateral bearings are employed in the machines the compensation measures are limited.

SUMMARY OF THE INVENTION

It is an object of the invention to provide an improved combination of a motorless agricultural machine with a vehicle.

Another object of the invention is to provide an agricultural machine in which a visibility for a driver observing the field is improved.

Still another object of the invention is to provide a combination of the vehicle with a rather heavy motorless field machine which may be compared to known self-propelled agricultural machines.

Even extremely large and powerful motorless machines corresponding to powerful self-propelled machines may be utilized in the arrangement proposed herein.

These and other objects of the invention are obtained by a combination, comprising a multi-purpose vehicle including a driven front axle with front wheels and an optionally non-steerable or driven rear axle with rear wheels, and a motorless agricultural machine coupled to said vehicle and laterally positioned thereto, said agricultural machine including a rigid non-steerable front axle with front wheels and a rear axle with steerable rear wheels, a coupling rod connecting the vehicle and the machine to each other and a coupling linkage pivotally interconnected between said vehicle and said machine and means for coaxially aligning, said front axle of the agricultural machine with the front axle of the vehicle.

The coupling linkage may be adapted to pivot from a position at one side of the machine to a position at an opposite side of the agricultural machine so that in transporting of the machine by the vehicle along a road said coupling linkage acts as a pulling means between the vehicle and the agricultural machine.

The coupling linkage may be of a fork-like configuration.

The coupling linkage may have at three ends thereof three pivots, one of said pivots being connected to the vehicle and two of said pivots being connected to said machine.

The vehicle at a rear end thereof may be provided with a first cantilever, said one pivot being vertically pivotally connected to said first cantilever, the agricultural machine being provided with a second and third cantilevers spaced from each other along one side of the agricultural machine, said two pivots being vertically pivotally connected to said second and third cantilevers, respectively.

The agricultural machine may have a fourth cantilever positioned at the side of the machine oppositely to said second and third cantilevers, said coupling linkage being adapted to pivot so that after disengaging the one of said two pivots from the third cantilever this one pivot is rotated toward the fourth cantilever and arrested therein to provide repositioning of the argicultural machine relative to the vehicle for transportation along a road.

It is further recommendable that the front wheels of the vehicle have approximately the same diameter as the front wheels of the agricultural machine.

In order to prevent that a driver should constantly turn in order to observe the position of the traveling agricultural machine the machine and the vehicle are so coupled that the front axle of the vehicle includes a drive shaft at least one front wheel on the front axle of the agricultural machine being driven from the front axle of the vehicle and said drive shaft.

In accordance with a further feature of the invention the vehicle is provided with a differential gearing which actuates the aformentioned drive shaft.

The combination of the invention may further include a coupling connected to the front wheel of the vehicle facing the agricultural machine, said drive shaft extending through said front wheel, and a coupling shaft interconnected between the coupling and the front wheel of the agricultural machine.

The front wheel of the vehicle connected to the coupling may be engaged to or disengaged from said drive shaft.

In accordance with a further feature of the invention the combination includes another drive shaft extending through the front wheel of the agricultural machine facing the vehicle, the coupling shaft being disengageably connected to another drive shaft.

The front wheel of the agricultural machine facing the vehicle may be freely mounted on said another drive shaft the front wheel of the agricultural machine facing from the vehicle being rigidly connected to another drive shaft. Both front wheels on the front axle of the vehicle may be driven so that the front wheel of the vehicle facing the agricultural machine is connected with the front wheel of the agricultural machine facing the vehicle immediately through said coupling shaft. Since both front wheels are usually spaced from one another a relatively small distance the difference in their rotation numbers during the turning movement of the vehicle may be disregarded.

In order to significantly improve the visibility of the driver a driver cabin is arranged in front of the front axle of the vehicle.

The novel features which are considered and characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

The sole FIGURE of the drawing illustrates schematically a top plan view of a multi-purpose vehicle connected to an agricultural machine in accordance with the invention.

DETAILED DESCRIPTION OF THE PREFERRED EMBODIMENT

Referring now to the drawing in detail, it will be seen that reference character 1 denotes a multi-purpose vehicle which has a non-steerable driven front axle 2 with front wheels 21 and 16 and a rear axle 3 supporting steerable rear wheels 40. Wheel 21 is rigidly mounted to axle 2. The rear axle 3 may be optionally driven or non-driven. An agricultural machine 4, for example harvester thresher is coupled to the vehicle 1 by means of a connecting rod 5. Agricultural machine 4 is motorless and has a non-steerable front axle 18 with wheels 20, 19 and a steerable rear axle 25 which supports rear wheels 42. Vehicle 1 and machine 4 are further coupled with one another by a coupling linkage 6 provided at its ends with pivots 7, 8 and 9 which are connected to the bottom plates of the vehicle and the machine, respectively. Coupling linkage 6 has a fork-shaped configuration and serves to transmit advance force from the vehicle to the harvester thresher. Pivot 7 is pivotally supported in a cantilever 10 of the vehicle whereas pivots 8 and 9 are pivotally supported in a vertical direction in respective cantilevers 11 and 12 of the agricultural machine 4 whereby the vehicle and the machine can move relative to each other vertically. The connecting rod 5 is similarily supported between the vehicle and the machine 4 but in a plane perpendicular to the plane of the drawing. As clearly seen in the drawing the agricultural machine 4 is provided at the side of its bottom plate opposite to the side having cantilevers 11 and 12 with an additional cantilever 13. When desired, for example for transportation of the vehicle with the agricultural machine along the road, connecting rod 5 is disengaged from the machine 4 and pivot 9 is disengaged from the cantilever 12 so that coupling linkage 6 can pivot in the counter clockwise direction, as shown in a dotted line, towards the cantilever 13 at which pivot 9 is thereafter locked. This pivoting movement is achieved by the movement of the vehicle itself whereby in the position, in which pivot 9 is locked at the cantilever 13, the agricultural machine 4 and the vehicle 1 take the road-transportation position in which coupling linkage 6 operates as a pulling means in a known fashion. It is, of course, to be understood that in order to change the position of the vehicle and the machine from their mutual parallel position, as shown in the drawing, to the road-transportation position a coupling shaft 14 must be disengaged from the machine 4.

The coupling shaft 14 is interconnected between a mechanical coupling or clutch 15 and wheel 20 of the agricultural machine. The coupling shaft 14 may be longitudinally adjusted. Coupling 15 of any known suitable type can selectively engage the coupling shaft 14 or wheel 16 of the vehicle with a drive shaft 17. The latter connection is required for driving of the vehicle 1 after the demounting of coupling shaft 14 has taken place.

For operating in a field coupling shaft 14 may be engaged at its one end with the clutch 15 connected to the drive shaft 17 of the front axle 2 and at its opposite end to a drive shaft 17a of the non-steerable front axle 18 of the agricultural machine so that the outer wheel 19 of machine 4 is driven and the inner wheel 20 is rotated therewith. Since in this case wheel 16 of the vehicle is disengaged from the drive shaft 17 by the coupling 15, this wheel 16 rotates freely whereas the outer wheel 21 of the vehicle is driven. The drive connection formed in such a fashion requires no anti-pivoting means at the side of the vehicle and no gyro moment will not be generated on the vehicle.

The difference in number of revolutions of two driven outer wheels 21 and 19 is compensated by means of a differential gearing 22. In order to achieve the above function it is required that the front wheels of the vehicle and those of the agricultural machine should be of approximately the same diameter. The offset in the acting line between the transport resistance force of the machine and the advance force of the vehicle hardly occurs so that even very heavy motorless agricultural machines may be coupled to the vehicle and effectively operate.

The vehicle is provided with a driver cabin 23 which is mounted in front of the front axle 2 in a direction of the advance movement of the vehicle whereby a fine visibility at both sides of the driver is warranted. It is to be realized that the driving of the aggregate of the agricultural machine derives in the known fashion from the driving of the vehicle through a drive not shown in the drawing.

It will be understood that each of the elements described above, or two or more together, may also find a useful application in other types of agricultural machines differing from the types described above.

While the invention has been illustrated and described as embodied in an agricultural machine, it is not intended to be limited to the details shown, since various modifcations and structural changes may be made without departing in any way from the spirit of the present invention.

Without further analysis, the foregoing will so fully reveal the gist of the present invention that other can, by applying current knowledge, readily adapt it for various applications without omitting features that, from the standpoint of prior art fairly constitute essential characteristics of the generic or specific aspects of this invention.

What is claimed as new and desired to be protected by Letters Patent is set forth in the appended claims:

1. In a machine for agricultural works, a combination comprising a multi-purpose vehicle including a driven front axle with front wheels and a rear axle with steerable rear wheels, a motorless agricultural machine coupled to said vehicle and including a non-steerable front axle with front wheels and a rear axle with steerable rear wheels; and means for selectively connecting said agricultural machine to said vehicle in one position in which said agricultural machine is disposed laterally of said vehicle for operation on a field and another position in which said agricultural machine is disposed behind said vehicle for transportation along a road, said connecting means including a connecting rod connectable between said vehicle and said agricultural machine to maintain them in said first position, a coupling linkage pivotally interconnected between said vehicle and said agricultural machine, and means for coaxially aligning the front axle of the agricultural machine with the front axle of the vehicle when the vehicle and the agricultural machine are in said first position.

2. The machine of claim 1, wherein said coupling linkage is adapted to pivot between an operative position in which it is pivotally connected to the agricultural machine at one side thereof and a transporting position in which the coupling linkage is pivotally connected to the agricultural machine at two opposite sides thereof and acts as a pulling means between the vehicle and the agricultural machine when they are in said second position.

3. The machine of claim 2, wherein said coupling linkage is of a fork-like configuration.

4. The machine of claim 3, wherein said coupling linkage has at three ends thereof three pivots, one of said pivots being connected to the vehicle and two of said pivots being connected to said agricultural machine.

5. The machine of claim 4, wherein said vehicle at a rear end thereof is provided with a first cantilever, said one pivot vertically pivotally connected to said first cantilever, the machine being provided with a second and third cantilevers spaced from each other along one side of the agricultural machine, said two pivots being vertically pivotally connected to said second and third cantilevers, respectively.

6. The machine of claim 5, said agricultural machine being provided with a fourth cantilever positioned at the side of the machine oppositely to said second and third cantilevers, said coupling linkage being adapted to pivot so that after disengaging the one of said two pivots from the third cantilever this one pivot is rotated toward said fourth cantilever and arrested therein to provide repositioning of said agricultural machine relative to said vehicle for transportation along a rod.

7. The machine of claim 6, wherein the front wheels of the vehicle have approximately the same diameter as the front wheels of the agricultural machine.

8. The machine of claim 7, said front axle of the vehicle including a first drive shaft, at least one front wheel on the front axle of the agricultural machine being driven from said first drive shaft.

9. The machine of claim 8, further including a differential gearing on the vehicle, which actuates said first drive shaft.

10. The machine of claim 9, said aligning means including a clutch connected to the front wheel of the vehicle facing the machine, said first drive shaft extending through said front wheel, and a coupling shaft interconnected between said clutch and the front wheel of the agricultural machine.

11. The machine of claim 10, wherein said front wheel of the vehicle, connected to the clutch is engageably and disengageably connected to said first drive shaft.

12. The machine of claim 11, further including a second drive shaft extending through the front wheel of the machine facing the vehicle, said coupling shaft being disengageably connected to said second drive shaft.

13. The machine of claim 12, the front wheel of the agricultural machine facing the vehicle being loosely mounted on said another drive shafts, the front wheel of the machine facing away from the vehicle being rigidly connected to said another drive shaft.

14. The machine of claim 8, wherein both front wheels on the front axle of the vehicle are driven so that the front wheel of the vehicle facing the machine is connected with the front wheel of the agricultural machine facing the vehicle immediately through said coupling shaft.

15. The machine of claim 13, further including a driver cabin arranged in front of said front axle of the vehicle.

16. The machine of claim 15, wherein said coupling shaft is longitudinally adjustable.

17. The machine of claim 16, wherein said agricultural machine is a harvester thresher.

* * * * *